United States Patent
Cho

[11] Patent Number: 6,053,565
[45] Date of Patent: Apr. 25, 2000

[54] SIDE IMPACT BAR ASSEMBLY

[75] Inventor: Kook Hyeon Cho, Kyungki-do, Rep. of Korea

[73] Assignee: Hyundai Motor Company, Seoul, Rep. of Korea

[21] Appl. No.: 09/068,347

[22] PCT Filed: Nov. 23, 1996

[86] PCT No.: PCT/KR96/00212

§ 371 Date: May 5, 1998

§ 102(e) Date: May 5, 1998

[87] PCT Pub. No.: WO97/18965

PCT Pub. Date: May 29, 1997

[30] Foreign Application Priority Data

Nov. 23, 1995 [KR] Rep. of Korea ...................... 95-43285

[51] Int. Cl.⁷ ........................................................ B60J 7/00
[52] U.S. Cl. .................... 296/188; 296/146.6; 296/146.9
[58] Field of Search ................................. 296/188, 146.6, 296/146.9; 49/502, 503

[56] References Cited

U.S. PATENT DOCUMENTS

| | | | |
|---|---|---|---|
| 2,438,238 | 3/1948 | Tonkin | 296/146.9 |
| 5,085,485 | 2/1992 | Wurl | 296/188 |
| 5,094,034 | 3/1992 | Freeman | 296/146.6 |
| 5,221,121 | 6/1993 | Zichner et al. | 296/188 |
| 5,224,752 | 7/1993 | Marshall | 296/188 |
| 5,255,487 | 10/1993 | Wieting et al. | 296/188 |
| 5,404,690 | 4/1995 | Hanf | 296/188 |
| 5,417,470 | 5/1995 | Holt | 296/146.6 |
| 5,527,082 | 6/1996 | Topker et al. | 296/188 |
| 5,544,930 | 8/1996 | Stedman | 296/146.6 |
| 5,573,298 | 11/1996 | Walker et al. | 296/188 |
| 5,580,120 | 12/1996 | Nees et al. | 296/188 |
| 5,647,631 | 7/1997 | Lee | 296/188 |
| 5,800,007 | 9/1998 | Cho | 296/188 |
| 5,895,088 | 4/1999 | Knott | 296/188 |
| 5,908,216 | 6/1999 | Townsend | 296/188 |

FOREIGN PATENT DOCUMENTS

| | | |
|---|---|---|
| 2709450 | 3/1995 | France . |
| 4240416 | 9/1993 | Germany . |
| 4213817 | 10/1993 | Germany . |

Primary Examiner—Joseph D. Pape
Assistant Examiner—Kiran Patel
Attorney, Agent, or Firm—Christie, Parker & Hale, LLP

[57] ABSTRACT

A side impact bar assembly has a stopper pin engaged into pores to securely hold an auxiliary bar to a side impact bar. In a side impact an impact plate is pushed, and the stopper pin is disengaged from the pores. Then, the auxiliary bar projects outwardly through the end of the side impact bar by a biasing force of a spring, and the projecting end of the auxiliary bar is inserted into a center pillar outer panel through holes.

8 Claims, 4 Drawing Sheets

SIDE IMPACT BAR ASSEMBLY

FIELD OF THE INVENTION

The present invention relates to a side impact bar assembly, and more particularly to a side impact bar assembly which can effectively dissipate impact force applied to a door upon side impact toward a pillar panel, to minimize the door being pushed inwardly and thereby reducing the probability of serious pelvis injury to a human body.

BACKGROUND

By various experiments and analyses, it has been found that the side rigidity of a door is less than that of other parts in an automobile. If the door is side impacted, it goes over a side sill and is pushed toward the passenger compartment, to cause an increase in pelvis injury to a human body.

To solve this problem, a side impact bar assembly is used. Referring to FIG. 1, there is illustrated a front view of a conventional side impact bar assembly mounted to a door inner panel; and FIG. 2 shows a transverse-sectional view taken along the line II-II' of FIG. 1. A side impact bar assembly 50 is provided between the door inner panel 56 and a door outer panel 58, and includes a side impact bar 52. One end of a pair of mounting brackets 54 is fastened to both ends of the side impact bar 52, respectively, and the other end of the pair of mounting brackets 54 is fastened to the door inner panel 56. The side impact bar 52 functions to reinforce side rigidity of a door. Reference numeral 60 represents a center pillar outer panel.

However, in the side impact bar assembly 50 constructed as mentioned above, even though the side impact bar 52 is used to reinforce side rigidity of the door, because a separate mechanism for holding the door to a portion of the pillar panel is not provided when side impact occurs, the door slantingly goes over the center pillar panel 60 and is still pushed into the passenger compartment, as shown by double dotted lines in FIG. 2, whereby the pelvis injury of a human body cannot be remarkedly decreased.

Another side impact bar assembly for settling this problem is disclosed in the Japanese Utility Model Publication No. 90-7613. Referring to FIG. 3, a side impact bar assembly 100 is provided between a door inner panel 104 and a door outer panel 106, and includes a side impact bar 102. In a direction along which the side impact bar 102 extends, a pair of holes 122 are oppositely formed in the door inner panel 104, and both ends of the side impact bar 102 are projected outward through the pair of holes 122, respectively. A guide bracket 108 is secured to the door inner panel 104, and the side impact bar 102 can be moved axially while being supported by the guide bracket 108. A fixed bracket 110 is secured to the outer surface of the side impact bar 102. One end of a spring 112 is fastened to the fixed bracket 110, and the other end of the spring 112 is fastened to the door inner panel 104. The spring 112 functions to pull the side impact bar 102 such that it projects toward a front pillar. In the outside of the door, a center pillar outer panel 114 is formed with a depression 116, and a front pillar outer panel 124 is formed with a rounded portion 118. In the outward end of the rounded portion 118, a projection 120 is defined in the front pillar outer panel 124.

When the door is closed, one end of the side impact bar 102 is contacted with the projection 120, and the other end of the side impact bar 102 is seated on the depression 116. If the door is opened, the other end of the side impact bar 102 is pulled inwardly of the door, and the one end of the side impact bar 102 is moved along the rounded portion 118 to further project outwardly. In a manner described above, the side impact bar 102 continuously moves while the door is closed and opened, to dissipate impact force applied to the door upon side impact toward the center pillar outer panel 114.

However, in the side impact bar assembly 100 having the construction mentioned above, since the side impact bar 102 continuously moves as the door is closed or opened, friction occurs between the rounded portion 118 and the one end of the side impact bar 102 and noise is generated, by which the lifetime of an automobile is shortened and reliable operation of the side impact bar 102 cannot be ensured.

SUMMARY OF THE INVENTION

Accordingly, the present invention has been made in an effort to solve the problems occurring in the prior art, and an object of the present invention is to provide a side impact bar assembly which can effectively dissipate impact force applied to a door upon side impact toward a pillar panel, to minimize the door being pushed inwardly thereby reducing the probability of serious pelvis injury to a human body.

According to one aspect of the present invention, there is provided a side impact bar assembly comprising: a hollow side impact bar secured to the door inner panel; an auxiliary bar received in said hollow side impact bar, one end of said auxiliary bar being held in said hollow side impact bar and the other end of said auxiliary bar being inserted into a hole formed in a pillar panel upon side impact; and means for biasing said auxiliary bar toward said pillar panel upon side impact.

According to another aspect of the present invention, said means for biasing said auxiliary bar comprises an inflator for generating gas in said side impact bar upon side impact.

According to still another aspect of the present invention, said assembly further comprises means for holding said auxiliary bar in said side impact bar when side impact has not occurred.

According to yet still another aspect of the present invention, said means for biasing said auxiliary bar comprises an elastic member; said means for holding said auxiliary bar comprises an impact plate having one end attached to the inner surface of a door outer panel and the other end formed with a stopper pin; and said stopper pin is engaged into pores formed in portions of said side impact bar and said auxiliary bar, which are remote from said door outer panel, when side impact has not occurred, and is disengaged from said pores upon side impact.

By the features of the present invention, when a side impact has not occurred, since the stopper pin of the guide member is engaged into the pores formed in the side impact bar and the auxiliary bar to securely hold the auxiliary bar to the side impact bar, it is possible to normally use the door. If a side impact occurs, as the impact plate is pushed inwardly toward the passenger compartment, the stopper pin is disengaged from the pores formed in the side impact bar and the auxiliary bar. The auxiliary bar is inserted into the holes formed in the pillar panel by a biasing force of gas generated by the inflator or the elastic member. Accordingly, by the fact that one end of the auxiliary bar is held in the side impact bar and the other end of the auxiliary bar is inserted into the pillar panel, the impact force applied to the door upon side impact can be effectively dissipated to the pillar panel to minimize the door's being pushed inwardly thereby pelvis injury to a human body can be reduced.

DESCRIPTION OF DRAWINGS

The above objects, and other features and advantages of the present invention will become more apparent after a reading of the following detailed description taken in conjunction with the drawings, in which.

DETAILED DESCRIPTION OF THE INVENTION

Figure 1:
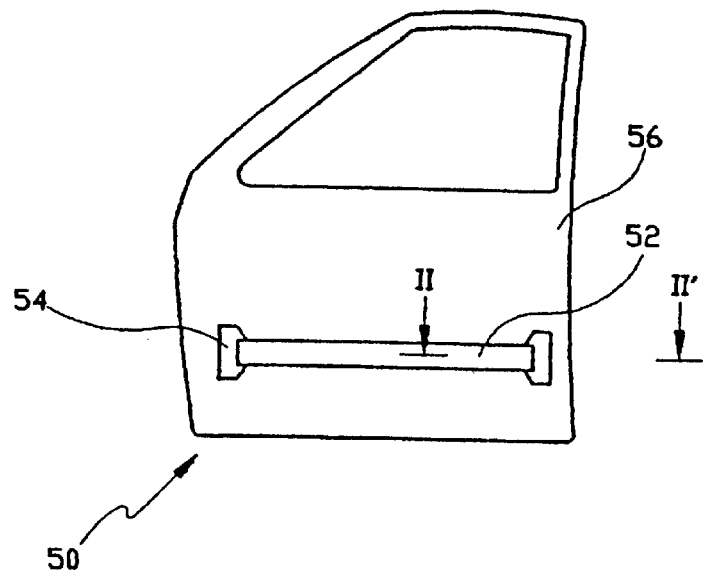
FIG. 1 is a front view of a conventional side impact bar assembly mounted to the door inner panel.
Figure 2:
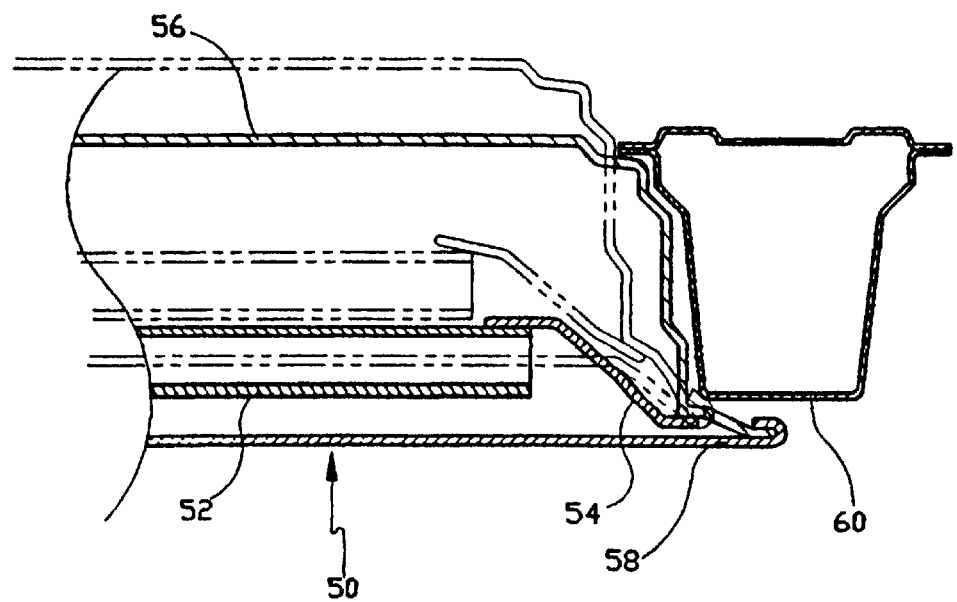
FIG. 2 is a transverse-sectional view taken along the line II–II' of FIG. 1.
Figure 3:
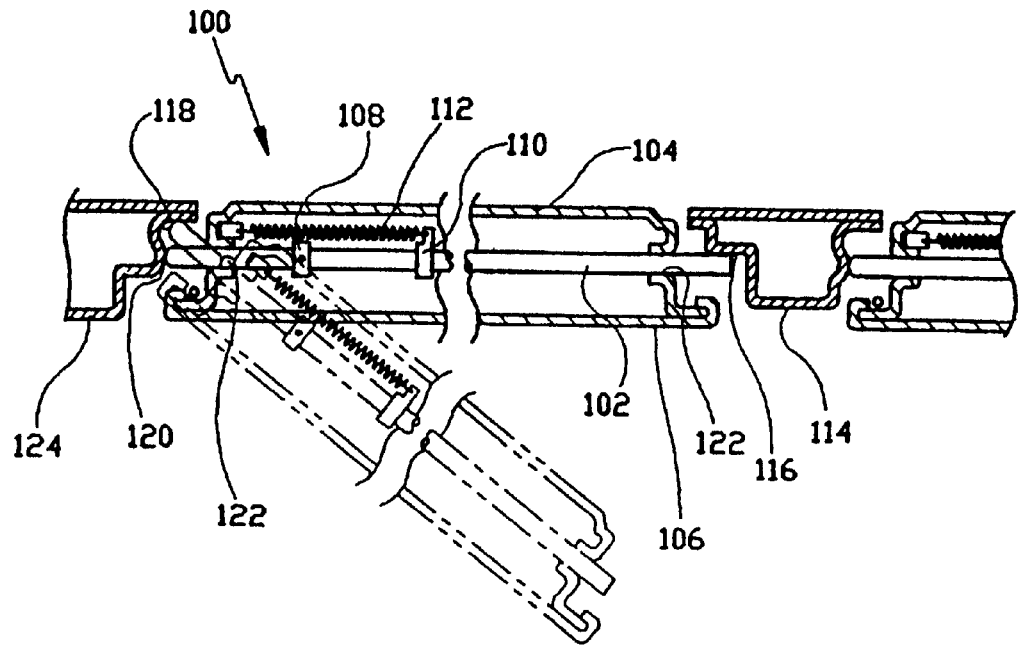
FIG. 3 is a transverse-sectional view of another conventional side impact bar assembly.

Reference will now be made in greater detail to a preferred embodiment of the invention, an example of which is illustrated in the accompanying drawings. Wherever possible, the same reference numerals will be used throughout the drawings to refer to the same or like parts.

Figure 4:
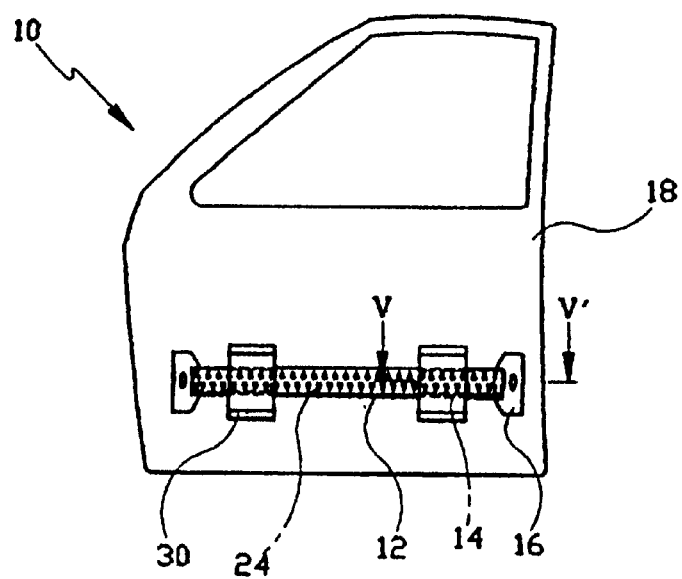
FIG. 4 is a front view of a side impact bar assembly mounted to a door inner panel, in accordance with an embodiment of the present invention.
Figure 5:
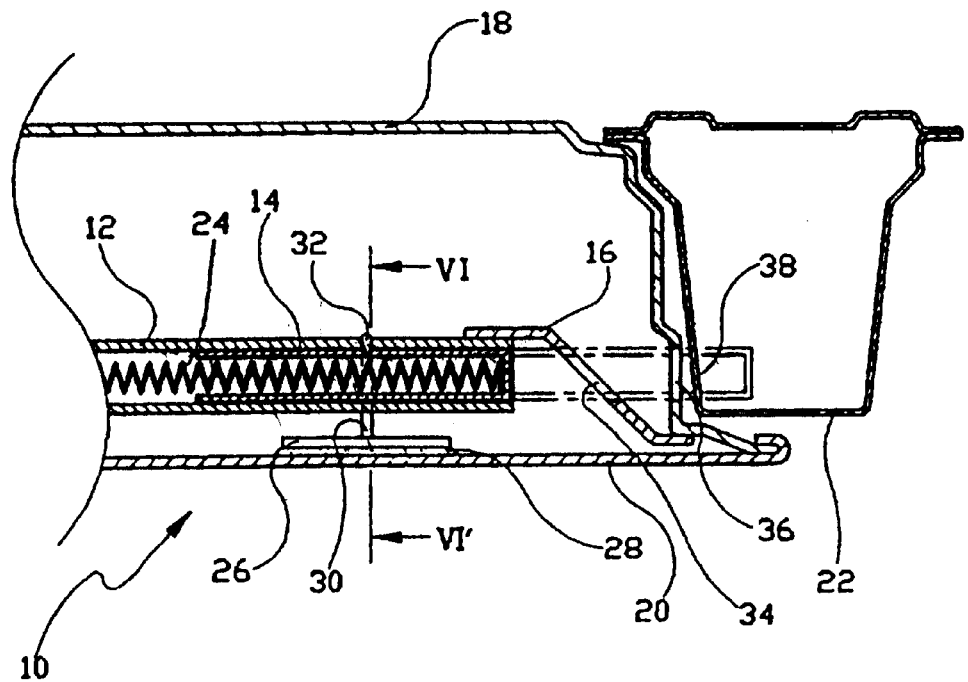
FIG. 5 is a transverse-sectional view taken along the line V–V' of FIG. 4.
Figure 6:
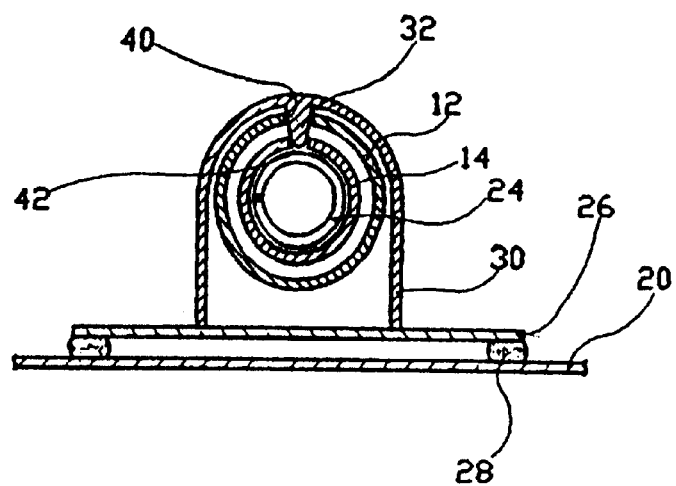
FIG. 6 is a cross-sectional view taken along the line VI–VI' of FIG. 5.

Referring to FIG. 4, there is illustrated a front view of a side impact bar assembly mounted to a door inner panel, in accordance with an embodiment of the present invention. The side impact bar assembly 10 of the present invention is provided between a door inner panel 18 and a door outer panel 20, and includes a side impact bar 12 and an auxiliary bar 14. A pair of mounting brackets 16 are fastened to both ends of the side impact bar 12, respectively, and the other ends of the pair of mounting brackets 16 are fastened to the door inner panel 18. The side impact bar 12 has a hollow shaped cross-section. A pair of auxiliary bars 14 are received in the side impact bar 12. The auxiliary bars 14 also have a hollow shaped cross-section, opposite ends of the auxiliary bars 14 are closed.

In the side impact bar 12, a spring 24 is arranged between the pair of auxiliary bars 14, and both ends of the spring 24 are seated to the inner surfaces of the closed ends of the auxiliary bars 14, respectively. The spring 24 functions to bias the auxiliary bars 14 such that they project outwardly through both ends of the side impact bar 12. Each of the mounting brackets 16 to which the side impact bars 12 are mounted is formed with a first hole 34. Outside the mounting brackets 16, the door inner panel 18 is formed with a second hole 36, and a portion of a center pillar outer panel 22, which corresponds to the second hole 36, is formed with a third hole 38.

An impact plate 26 is attached to the inner surface of the door outer panel 20 by an adhesive 28, and both ends of a guide member 30 which has a substantially 180° rotated 'U' cross-section are fastened to the impact plate 26. The inner surface of the guide member 30, which is remote from the impact plate 26 is integrally formed with a stopper pin 32, and portions of the side impact bar 12 and the auxiliary bar 14, which are remote from the impact plate 26 are formed with pores 40 and 42, respectively, which are communicated with each other.

When a side impact has not occurred, the stopper pin 32 is engaged into the pores 40 and 42 to securely hold the auxiliary bar 14 to the side impact bar 12. If a side impact has occurred, as the impact plate 26 is pushed, the stopper pin 32 is disengaged from the pores 40 and 42. Then, the auxiliary bar 14 projects outwardly through the end of the side impact bar 12 by a biasing force of the spring 24, and the projecting end of the auxiliary bar 14 is inserted into the center pillar outer panel 22 through the holes 34, 36 and 38. The length of each auxiliary bar 14 is set such that when a side impact occurs, one end of the auxiliary bar 14 is held in the side impact bar 12 and the other end of the auxiliary bar 14 is inserted into the center pillar outer panel 22. To this end, it is possible that a stopper plate for limiting movement of the auxiliary bar 14 to some extent is provided in the center pillar.

The side impact bar assembly constructed as mentioned above according to the present invention, has the advantage in that since one end of the auxiliary bar is held in the side impact bar and the other end of the auxiliary bar is inserted into the pillar panel upon side impact, impact force applied to the door upon side impact can be dissipated into the pillar panel to minimize the door being pushed inwardly, thereby pelvis injury to a human body can be reduced.

Figure 7:
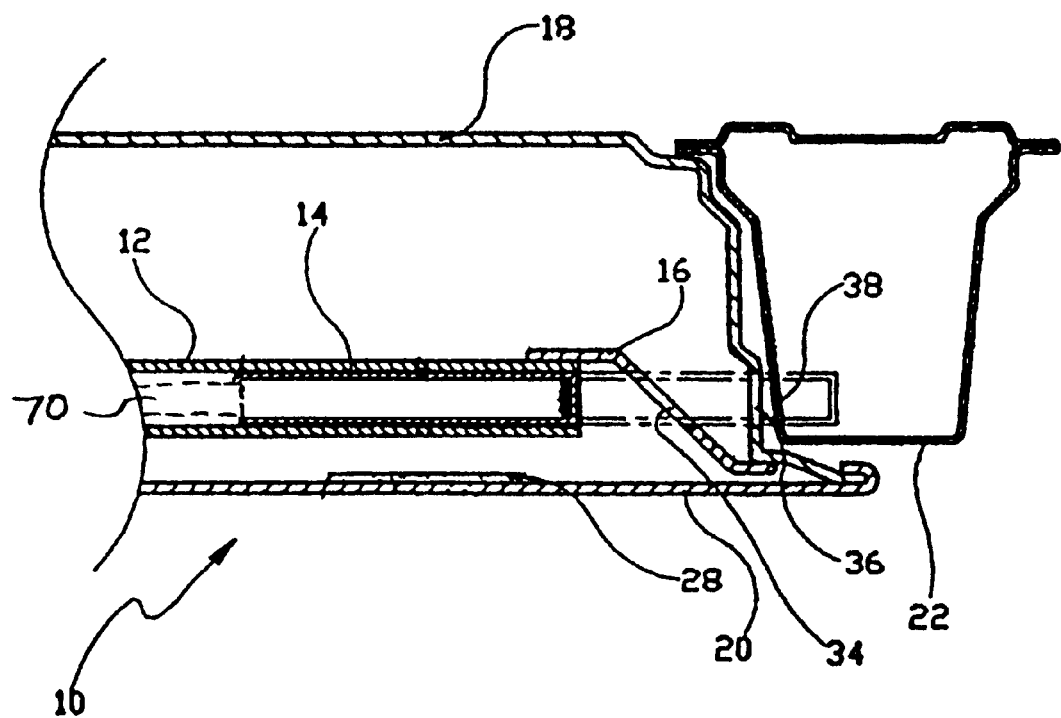
FIG. 7 is a transverse-sectional view taken along the line V–V' of FIG. 4 with an inflator for generating gas 70.

In the drawings and specification, there have been disclosed typical preferred embodiments of the invention and, although specific terms are employed, they are used in a generic and descriptive sense only and not for purposes of limitation, the scope of the invention being set forth in the following claims. According to another aspect of the present invention as shown in FIG. 7, said means for biasing said auxiliary bar 14 comprises an inflator, shown schematically at 70, for generating gas in said side impact bar 12 upon side impact. For example, it is to be readily understood that instead of the side impact plate 26 and the guide member 30, including stopper pin 32, for securely holding the auxiliary bar 14 to the side impact bar 12, an inflator is disposed in the side impact bar 12. Also, the impact plate 26 and the guide member 30 can be integrally manufactured.

What is claimed is:

1. A side impact bar assembly comprising:

a hollow side impact bar secured to a door inner panel;

an auxiliary bar received in said hollow side impact bar, one end of said auxiliary bar being held in said hollow side impact bar and the other end of said auxiliary bar being inserted into a hole formed in a pillar panel, upon side impact; and means for biasing said auxiliary bar toward said pillar panel upon side impact.

2. A side impact bar assembly as claimed in claim 1, wherein said means for biasing said auxiliary bar comprises an inflator for generating gas in said side impact bar upon side impact.

3. A side impact bar assembly as claimed in claim 1, wherein said assembly further comprises means for holding said auxiliary bar in said side impact bar when a side impact has not occurred.

4. A side impact bar assembly as claimed in claims 1 or 3, wherein said means for biasing said auxiliary bar comprises an elastic member; wherein said means for holding said auxiliary bar comprises an impact plate having one end attached to an inner surface of a door outer panel and the other end formed with a stopper pin; and wherein said stopper pin is engaged into pores formed in portions of said side impact bar and said auxiliary bar, which are remote from said door outer panel, when a side impact has not occurred, and is disengaged from said pores upon side impact.

5. A side impact bar assembly comprising:

a hollow side impact bar secured to a door inner panel;

an auxiliary bar received in said hollow side impact bar, one end of said auxiliary bar being held in said hollow side impact bar and the other end of said auxiliary bar being inserted into a hole formed in a pillar panel upon side impact; and a device biasing said auxiliary bar toward said pillar panel upon side impact.

6. The side impact bar assembly of claim 5, wherein the device biasing said auxiliary bar toward said pillar panel comprises an inflator for generating gas in said side impact bar upon side impact.

7. The side impact bar assembly of claim 5 further comprising a device holding said auxiliary bar in said side impact bar when a side impact has not occurred.

8. A side impact bar assembly of claims 5 or 7, wherein said device biasing said auxiliary bar comprises an elastic member;

wherein the device holding said auxiliary bar has an impact plate having one end attached to an inner surface of a door outer panel and the other end formed with a stopper pin;

wherein said stopper pin is engaged into pores formed in portions of said side impact bar and said auxiliary bar when a side impact has not occurred;

wherein said stopper is disengaged from said pores upon side impact; and wherein the pores are remote from said door outer panel.

* * * * *